(12) United States Patent
Srivastava et al.

(10) Patent No.: US 6,965,193 B2
(45) Date of Patent: *Nov. 15, 2005

(54) RED PHOSPHORS FOR USE IN HIGH CRI FLUORESCENT LAMPS

(75) Inventors: Alok Srivastava, Niskayuna, NY (US); Holly Comanzo, Niskayuna, NY (US); Vankatesan Manivannan, Rexford, NY (US); Anant Achyut Setlur, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 10/317,423

(22) Filed: Dec. 12, 2002

(65) Prior Publication Data

US 2004/0113538 A1 Jun. 17, 2004

(51) Int. Cl.⁷ .......................... H01J 63/04; C09K 11/08
(52) U.S. Cl. ................ 313/486; 313/485; 252/301.4 R; 252/301.6 P; 252/301.35
(58) Field of Search ................................. 313/485, 486; 252/301.4 R, 301.6 P, 301.35

(56) References Cited

U.S. PATENT DOCUMENTS

| | | | | |
|---|---|---|---|---|
| 3,450,642 A | * | 6/1969 | Hoffman | 252/301.4 R |
| 4,267,485 A | * | 5/1981 | Murakami et al. | 313/486 |
| 4,806,824 A | | 2/1989 | Paynter et al. | |
| 4,874,984 A | | 10/1989 | Sigai et al. | |
| 4,891,550 A | | 1/1990 | Northrop et al. | |
| 4,924,141 A | * | 5/1990 | Taubner et al. | 313/488 |
| 5,049,779 A | * | 9/1991 | Itsuki et al. | 313/486 |
| 5,207,948 A | | 5/1993 | Wolfe et al. | |
| 5,350,971 A | | 9/1994 | Jeong | |
| 5,714,836 A | | 2/1998 | Hunt et al. | |
| 5,731,658 A | * | 3/1998 | Lengyel et al. | 313/486 |
| 5,731,659 A | | 3/1998 | Soules et al. | |
| 5,838,101 A | * | 11/1998 | Pappalardo | 313/487 |
| 5,869,927 A | | 2/1999 | Matsuo et al. | |
| 6,116,754 A | | 9/2000 | Ocsovai et al. | |
| 6,137,217 A | | 10/2000 | Pappalardo et al. | |
| 6,222,312 B1 | | 4/2001 | Ghosh et al. | |
| 6,249,328 B1 | | 6/2001 | Fukuzawa et al. | |
| 6,294,800 B1 | | 9/2001 | Duggal et al. | |
| 6,302,959 B2 | | 10/2001 | Srivastava et al. | |
| 6,369,502 B1 | | 4/2002 | Auber et al. | |
| 6,380,669 B1 | * | 4/2002 | Zachau et al. | 313/487 |
| 6,400,097 B1 | | 6/2002 | Jin et al. | |
| 6,402,987 B1 | | 6/2002 | Srivastava et al. | |
| 6,429,583 B1 | | 8/2002 | Levinson et al. | |
| 6,517,741 B1 | * | 2/2003 | Feldmann et al. | 252/301.4 F |

* cited by examiner

*Primary Examiner*—Nimeshkumar D. Patel
*Assistant Examiner*—Sharlene Leurig
(74) *Attorney, Agent, or Firm*—Fay, Sharpe, Fagan, Minnich & McKee, LLP

(57) ABSTRACT

Novel red emitting phosphors for use in fluorescent lamps resulting in superior color rendering index values compared to conventional red phosphors. Also disclosed is a fluorescent lamp including a phosphor layer comprising blends of one or more of a blue phosphor, a blue-green phosphor, a green phosphor and a red phosphor selected from the group consisting of $SrY_2O_4:Eu^{3+}$, $(Y,Gd)Al_3B_4O_{12}:Eu^{3+}$, and $[(Y_{1-x-y-m}La_y)Gd_x]BO_3:Eu_m$ wherein $y<0.50$ and $m=0.001-0.3$. The phosphor layer can optionally include an additional deep red phosphor and a yellow emitting phosphor. The resulting lamp will exhibit a white light having a color rendering index of 90 or higher with a correlated color temperature of from 2500 to 10000 Kelvin. The use of the disclosed red phosphors in phosphor blends of lamps results in high CRI light sources with increased stability and acceptable lumen maintenance over the course of the lamp life.

29 Claims, 4 Drawing Sheets

RED PHOSPHORS FOR USE IN HIGH CRI FLUORESCENT LAMPS

The U.S. Government has a paid-up license in this invention and the right in limited circumstances to require the patent owner to license others on reasonable terms as provided for by the terms of Contract No. DE-FC26-99FT40632 awarded by the Department of Energy.

FIELD OF INVENTION

The present invention relates to phosphor compositions, particularly phosphors for use in fluorescent lamps. More particularly, the present invention relates to red emitting phosphor for use in a fluorescent lamp and a fluorescent lamp employing the same having a high color rendering index.

BACKGROUND OF THE INVENTION

Fluorescent lamps typically have a transparent glass envelope enclosing a sealed discharge space containing an inert gas and mercury vapor. When subjected to a current provided by electrodes, the mercury ionizes to produce radiation having primary wavelengths of 185 nm and 254 nm. This ultraviolet radiation, in turn, excites phosphors on the inside surface of the envelope to produce visible light which is emitted through the glass.

Generally, a fluorescent lamp for illumination uses a phosphor which absorbs the 254 nm Hg-resonance wave and is activated so as to convert the ultraviolet luminescence of mercury vapor into visible light. In some conventional fluorescent lamps, a white-emitting calcium halophosphate phosphor, such as $Ca_{10}(PO_4)_6(F,Cl)_2$:Sb,Mn, has been used. More recently, in order to improve the color-rendering properties and emission output of fluorescent lamps, efficient illumination of a white color is provided using a three-band type fluorescent lamp which employs the proper mixture of red, green and blue-emitting phosphors whose emission spectrum occupies a relatively narrow band, has been put to practical use. For example, for the blue-emitting phosphor, europium-activated barium magnesium aluminate phosphor ($BaMg_2Al_{16}O_{27}$:$Eu^{2+}$), for the green-emitting phosphor, cerium and terbium-activated magnesium aluminate phosphor [(Ce,Tb)$MgAl_{11}O_{19}$], and for the red-emitting phosphor, europium-activated yttrium oxide phosphor ($Y_2O_3$:$Eu^{3+}$) may be used and are mixed in an adequate ratio. The combined spectral output of the phosphor blend produces a white light.

In such a three-band type phosphor lamp, the emitting colors of the respective phosphors are considerably different from one another. Therefore, if the emitting intensity of any of the three corresponding phosphors is decreased, color deviation occurs, degrading the color-rendering properties of the lamp.

The apparent color of a light source is described in terms of color temperature, which is the temperature of a black body that emits radiation of about the same chromaticity as the radiation considered. A light source having a color temperature of 3000 Kelvin has a larger red component than a light source having a color temperature of 4100 Kelvin. The color temperature of a lamp using a phosphor blend can be varied by changing the ratio of the phosphors.

Color quality is further described in terms of color rendering, and more particularly color rendering index (CRI or $R_a$), which is a measure of the degree to which the psycho-physical colors of objects illuminated by a light source conform to those of a reference illuminant for specified conditions. CRI is in effect a measure of how well the spectral distribution of a light source compares with that of an incandescent (blackbody) source, which has a Planckian distribution between the infrared (over 700 nm) and the ultraviolet (under 400 nm). The discrete spectra which characterize phosphor blends will yield good color rendering of objects whose colors match the spectral peaks, but not as good of objects whose colors lie between the spectral peaks.

The color appearance of a lamp is described by its chromaticity coordinates which can be calculated from the spectral power distribution according to standard methods. See CIE, *Method of measuring and specifying color rendering properties of light sources* (2nd ed.), Publ. CIE No. 13.2 (TC-3,2), Bureau Central de la CIE, Paris, 1974. The CIE standard chromaticity diagram includes the color points of black body radiators at various temperatures. The locus of black body chromaticities on the x,y-diagram is known as the Planckian locus. Any emitting source represented by a point on this locus may be specified by a color temperature. A point near but not on this Planckian locus has a correlated color temperature (CCT) because lines can be drawn from such points to intersect the Planckian locus at this color temperature such that all points look to the average human eye as having nearly the same color. Luminous efficacy of a source of light is the quotient of the total luminous flux emitted by the total lamp power input as expressed in lumens per watt (LPW or lm/W).

Spectral blending studies have shown that the luminosity and CRI of white light sources are dependent upon the spectral distribution of color components. Red phosphors are important components, the performance of which is important to maximize CRI. It is expected that such phosphors preserve structural integrity during extended lamp operation such that the phosphors remain chemically stable over a period of time while maintaining stable CIE color coordinates of the lamp. High CRI light sources require a deep red emission at higher wavelengths than current red phosphors such as $Y_2O_3$:$Eu^{3+}$, which has its primary emission band at 611 nm. In addition, a narrow red line emitter is desired to maximize intensity and minimize emission in regions where the eye sensitivity is low. Such phosphors can be used in existing 3-band lamps to increase the lamp's CRI.

Thus, a need exists for red phosphors that have narrow line emission and deeper red emissions for use in phosphor blends to produce fluorescent lamps having an increased CRI while remaining stable and relatively maintenance free.

SUMMARY OF THE INVENTION

In one aspect, the invention provides a phosphor blend including at least one of each of a blue phosphor, a green phosphor, a blue green phosphor and a red phosphor selected from the group consisting of $SrY_2O_4$:$Eu^{3+}$, (Y,Gd)$Al_3B_4O_{12}$:$Eu^{3+}$, $(Y_{0.55-x}Ln_xGd_{0.35}Eu_{0.10})BO_3$, and $[(Y_{1-x-y-m}La_y)Gd_x]BO_3$:$Eu^{3+}_m$ (y<0.50, m=0.001–0.3).

In a second aspect, the present invention provides a phosphor blend including $SrY_2O_4$:$Eu^{3+}$ and at least one of each of a blue phosphor, a green phosphor, and a blue-green phosphor.

In a third aspect, the present invention provides a phosphor blend including (Y,Gd)$Al_3B_4O_{12}$:$Eu^{3+}$ and at least one of each of a blue phosphor, a green phosphor, and a blue-green phosphor.

In a fourth aspect, the present invention provides a phosphor blend including $[(Y_{1-x-y-m}La_y)Gd_x]BO_3$:$Eu_m$ (y<0.50, m=0.001–0.3) and at least one of each of a blue phosphor, a green phosphor, and a blue-green phosphor.

In a fifth aspect, the present invention provides an arc discharge lamp including a blue phosphor, a green phosphor, a blue-green phosphor and a red phosphor selected from the group consisting of $SrY_2O_4:Eu^{3+}$, $(Y,Gd)Al_3B_4O_{12}:Eu^{3+}$, and $[(Y_{1-x-y-m}La_y)Gd_x]BO_3:Eu_m$ (y<0.50, m=0.001–0.3), the arc discharge lamp having a CRI of greater than 90 and a correlated color temperature of from 2500–10000 Kelvin.

DETAILED DESCRIPTION OF THE INVENTION

Figure 1:
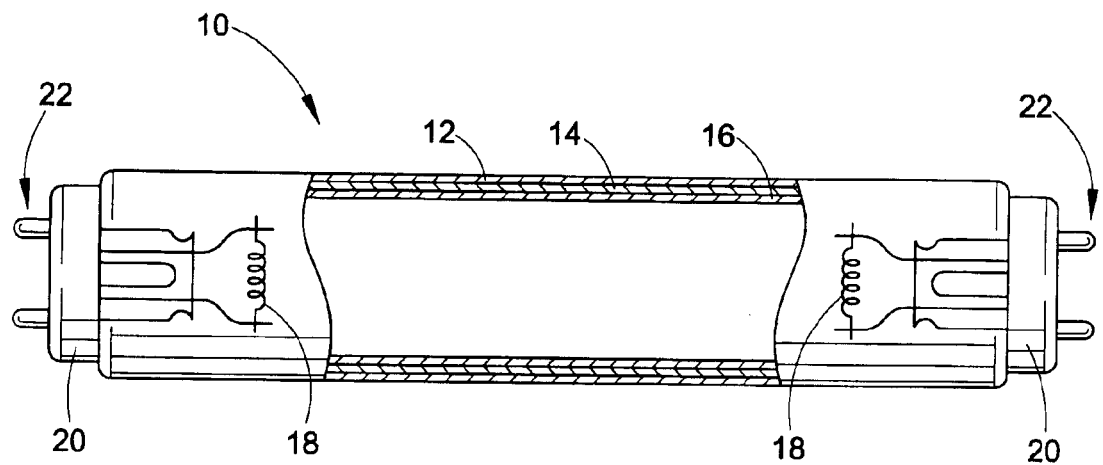
FIG. 1 is a schematic cross-section of a fluorescent lamp.
Figure 2:
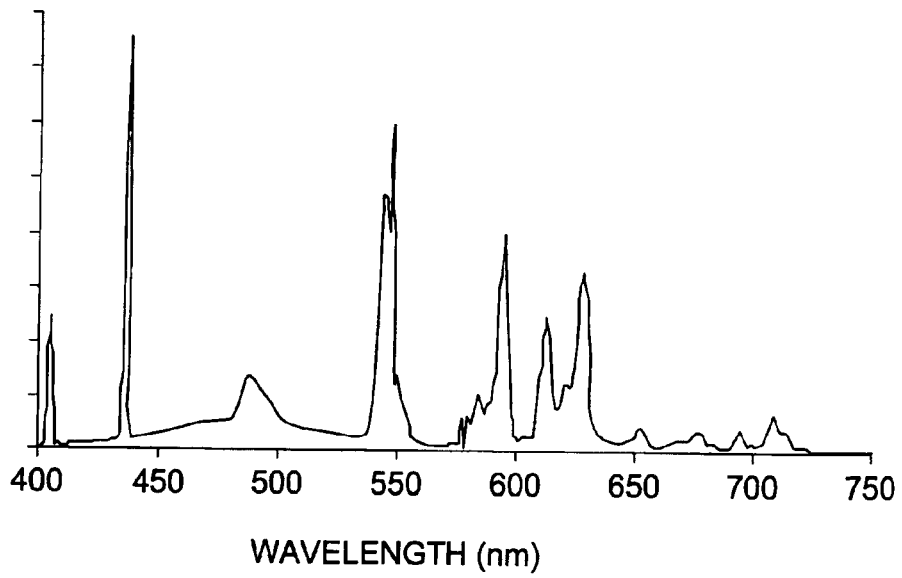
FIG. 2 is a plot of light output versus wavelength for a lamp having a phosphor layer according to the invention.

Referring to FIG. 1, there is depicted a representative fluorescent lamp 10 comprising an elongated glass envelope 12 having a circular cross-section. The low pressure mercury discharge assembly in said lamp includes a pair of spaced conventional electrode structures 18 at each end connected to electrical contacts 22 of a base 20 fixed at both ends of the sealed glass envelope. The discharge-sustaining filling in said sealed glass envelope is an inert gas such as argon or a mixture of argon and other rare earth gases at a low pressure in combination with a small quantity of mercury to provide the low vapor pressure manner of lamp operation. Deposited on the inner surface of the glass envelope is a phosphor blend layer 16 comprising at least one of each of a red, green, blue-green and blue emitting phosphor according to the present invention. In one embodiment of the invention, the lamp 10 can have a second layer of material 14 positioned between the phosphor blend layer 16 and the inner surface of the glass envelope 12. This second layer can be a second phosphor layer comprising a conventional calcium halophosphate phosphor. Alternately or in addition to a second phosphor layer, the second layer can be an ultraviolet reflecting barrier layer as is known in the art. Such a barrier layer can comprise, for example, a mixture of alpha- and gamma-aluminum particles.

The above illustrated dual phosphor layer coatings can be formed by various already known procedures including deposition from liquid suspensions and electrostatic deposition. For example, the base layer of calcium halophosphate phosphor can be deposited on the glass surface from a conventional aqueous suspension including various organic binders and still other adherence promoting agents. Said aqueous suspension is applied and then dried in the conventional manner. A suitable liquid suspension of the present phosphor blend can thereafter be deposited on the dried base phosphor layer again in said conventional manner.

The phosphors for use in the present invention may be made by any ceramic powder method, such as a liquid phase (flux) method or a solid state method. Preferably, the method of making the phosphor comprises the following steps. First, compounds of the phosphor material are mixed in a crucible or another suitable container, such as a ball mill. For example, the starting materials may be blended using a ball mill with $ZrO_2$ or yttrium toughened zirconia milling media. The preferred starting phosphor compounds comprise oxides, carbonates, hydroxides, nitrates or oxalates of the metal constituents. For example, to form $SrY_2O_4:Eu$, strontium carbonate ($SrCO_3$), yttrium oxide ($Y_2O_3$), and $Eu_2O_3$ may be mixed in the crucible or ball mill.

The blended materials may then fired in air or a reducing atmosphere for 5–15 hours at 1,400 to 1600° C., preferably for 10 hours at 1500° C. to sinter the material. The reducing atmosphere may comprise forming gas (2 percent hydrogen and 98 percent nitrogen). Preferably, the starting materials also contain a flux that promotes the reaction of the starting materials during the firing step to form the ceramic phosphor. Preferably, the flux comprises a halogen compound, such as a fluoride or a chloride compound. The preferred halogen compounds comprise magnesium, aluminum or strontium fluoride or magnesium, strontium, manganese or ammonium chloride. However, the phosphor may be fired without adding a flux. The fired mixture is then coated onto the substrate, such as a lamp bulb. Preferably, a suspension of the mixture particles and a liquid is used to coat the substrate.

In one embodiment of the present invention, the red emitting phosphor of the phosphor blend layer is a rare earth activated strontium yttrium oxide phosphor having the formula $SrY_2O_4:Eu^{3+}$.

The $SrYO_4:Eu^{3+}$ phosphor has a peak emission wavelength at about 616 nm and weak sub bands at around 590 nm and 700 nm with minimal orange and deep red peaks. The use of $SrY_2O_4:Eu^{3+}$, which exhibits a narrow emission and a deeper red color with its main emission at 616 nm allows for the production of higher CRI light sources than those made using known red phosphors having a broader emission pattern and a greater orange emission color such as $Y_2O_3:Eu^{3+}$, which has its main emission at 611 nm. In addition, the spectral distribution of $SrY_2O_4:Eu^{3+}$, as exhibited by its symmetrical emission peak, offers significant improvements over current red phosphors such as $Y_2O_2S:Eu^{3+}$ or $GdAlO_3:Eu^{3+}$ (GAL), which have maintenance and stability concerns.

Figure 3:
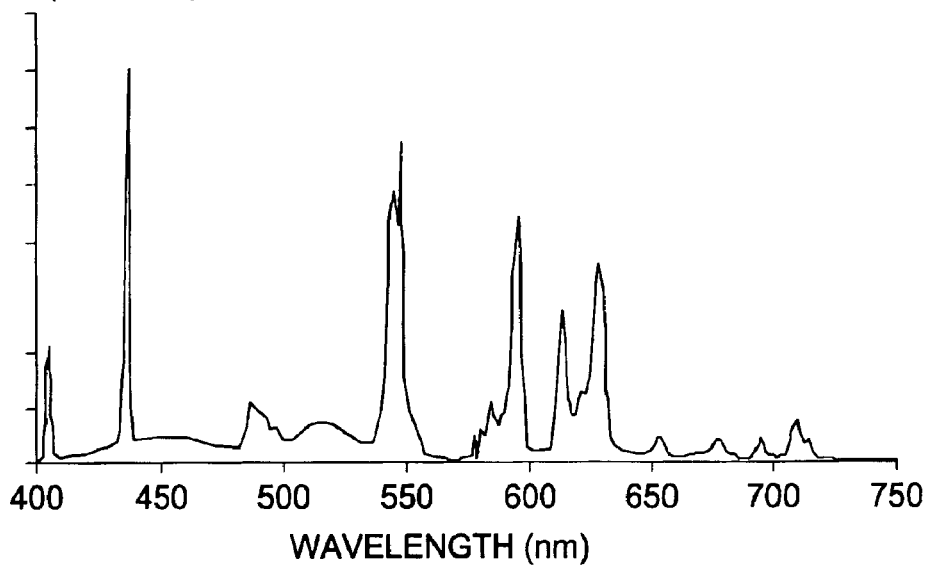
FIG. 3 is a plot of light output versus wavelength for a lamp having a phosphor layer according to the invention.

In a second embodiment of the invention, the red phosphor for use in the phosphor blend is $(Gd,Y)Al_3B_4O_{12}:Eu^{3+}$ (GABO). FIG. 3 shows the emission spectrum of $(Gd,Y)Al_3B_4O_{12}:Eu^{3+}$. As seen in FIG. 3, the $(Gd,Y)Al_3B_4O_{12}:Eu^{3+}$ phosphor has a peak emission wavelength at about 614–615 nm and weak orange and deep red sub bands at around 585 nm and 700 nm. The use of GABO, which exhibits a narrow emission and a truer red color with its main emission at 614–615 nm allows for the production of higher CRI light sources than those made using known red phosphors having a broader emission pattern and more intense orange emissions such as $Y_2O_3:Eu^{3+}$, which has its main emission at 611 nm and relatively high intensity orange and deep red peaks at about 585 nm and 690 nm, respectively. In addition, the spectral distribution of GABO, as exhibited by its symmetrical emission peak, offers significant improvements over current red phosphors such as $Y_2O_2S:Eu^{3+}$ or $GdAlO_3:Eu^{3+}$ (GAL), which have maintenance and stability concerns.

Figure 4:
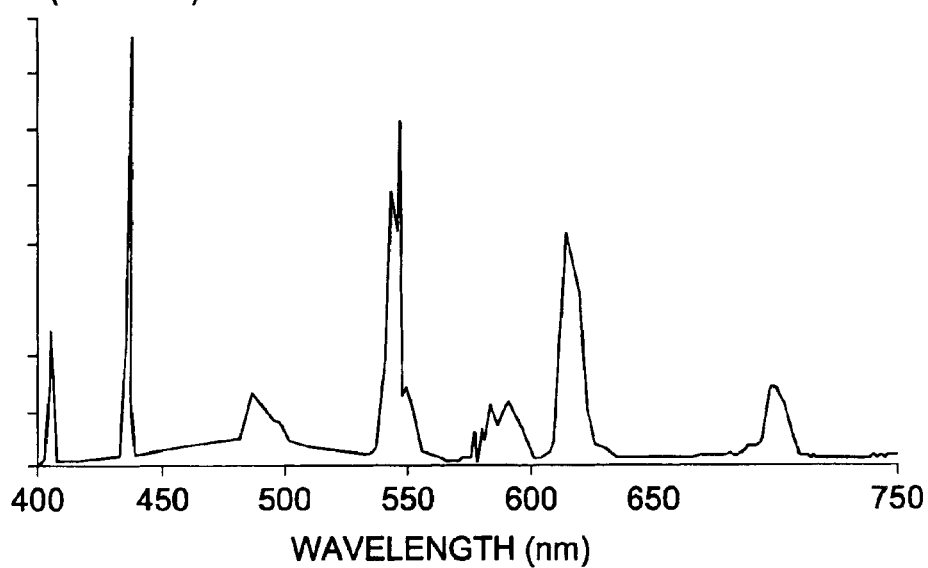
FIG. 4 is a plot of light output versus wavelength for a lamp having a phosphor layer according to the invention.
Figure 5:
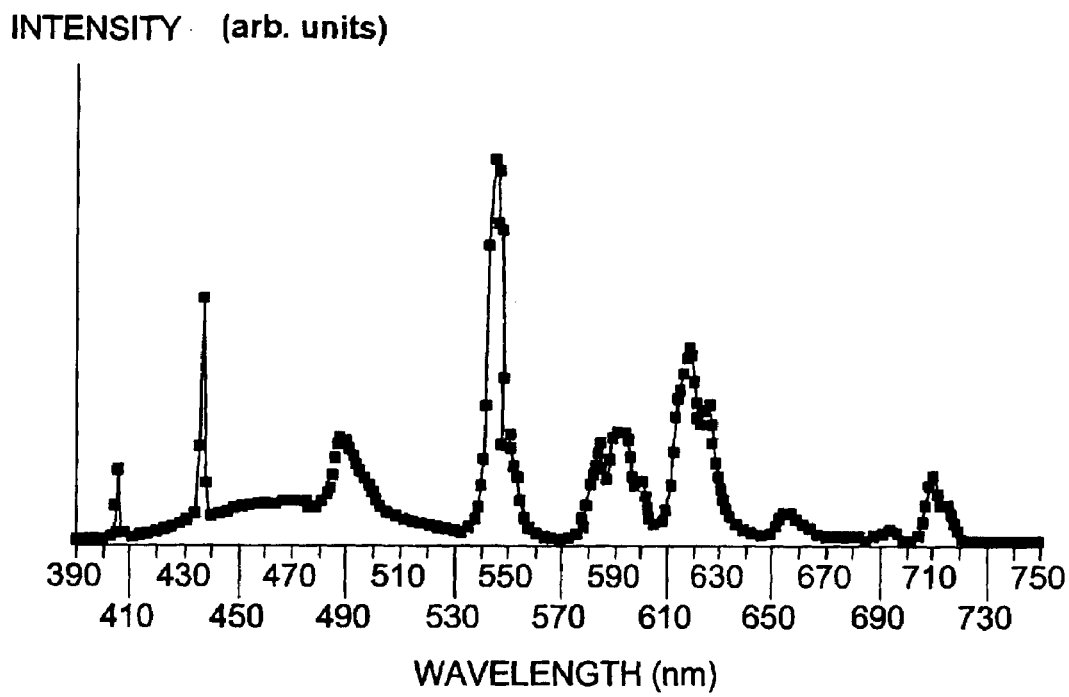
FIG. 5 is a plot of light output versus wavelength for a lamp having a phosphor layer according to the invention.

In a third embodiment of the invention, the red phosphor for use in the phosphor blend is a phosphor having the general formula $[(Y_{1-x-y-m}La_y)Gd_x]BO_3:Eu_m$ (YLGB) where (y<0.50, m=0.001–0.3). One preferred YLGB phosphor is $(Y_{0.55}Gd_{0.35}Eu_{0.10})BO_3$. A second preferred YLGB phosphor is $(Y_{0.55-x}La_xGd_{0.35}Eu_{0.10})BO_3$. FIG. 4 shows the emission spectrum of $(Y_{0.55-x}La_xGd_{0.35}Eu_{0.10})BO_3$. As seen in FIG. 4, the $(Y_{0.55-x}La_xGd_{0.35}Eu_{0.10})BO_3$ phosphor has an emission spectrum having three primary emission at about 595, 612, and 628 nm. The spectral distribution of YLGB offers significant improvements over current red phosphors with a reduced intensity in deep red regions (680–720 nm), thus allowing for the production of higher CRI light sources than those made using known red phosphors having a broader emission pattern and more intense deep emissions such as $Y_2O_3:Eu^{3+}$, which has a significant emission peak at about 690 nm. In addition, YLGB offers significant improvements over current red phosphors such as $Y_2O_2S:Eu^{3+}$ or $GdAlO_3:Eu^{3+}$ (GAL), which have maintenance and stability concerns.

As stated above, the red phosphor of any of the three embodiments of the present invention is preferably blended with at least one of a green phosphor, a blue-green phosphor and a blue phosphor to form a phosphor blend 16, for use in the above described fluorescent lamp 10. In addition, an orange phosphor and a separate red phosphor may also be added to the phosphor blend. The red phosphor can be blended with any conventional known phosphors to produce a phosphor blend of the present invention capable of emitting white light. Preferably, the red phosphor is blended with one or more of each of a green phosphor having a peak emission at about 525 nm to about 570 nm, a blue-green phosphor having a peak emission at about 475–525, and a blue phosphor having a peak emission at about 430 to about 475 nm. Also included in the blend may be a second deep red phosphor having a peak emission at about 615 to 665 nm and/or an orange phosphor having a peak emission from about 550 to 600 nm. Non-limiting examples of green emitting phosphors include rare earth activated phosphors such as Tb—Ce activated magnesium aluminate, yttrium silicate and lanthanum orthophosphate. Non-limiting examples of suitable blue phosphors include europium activated barium magnesium aluminate, strontium chlorophosphate, or strontium barium calcium chlorophosphate. Non-limiting examples of suitable red phosphors include europium activated gadolinium oxide and yttrium oxide. Other suitable phosphors include those listed below.

BLUE:
$(Ba,Sr,Ca)_5(PO_4)_3(Cl,F,OH):Eu^{2+}, Mn^{2+}, Sb^{3+}$
$(Ba,Sr,Ca)MgAl_{10}O_{17}:Eu^{2+}, Mn^{2+}$
$(Ba,Sr,Ca)BPO_5:Eu^{2+}, Mn^{2+}$

BLUE-GREEN:
$Sr_4Al_{14}O_{25}:Eu^{2+}$
$BaAl_8O_{13}:Eu^{2+}$
$2SrO-0.84P_2O_{5-0.16}B_2O_3:Eu^{2+}$
$MgWO_4$
$BaTiP_2O_8$
$(Ba,Sr,Ca)MgAl_{10}O_{17}:Eu^{2+}, Mn^{2+}$
$(Ba,Sr,Ca)_5(PO_4)_3(Cl,F,OH):Eu^{2+}, Mn^{2+}, Sb^{3+}$

GREEN:
$LaPO_4:Ce^{3+}, Tb^{3+}$
$CeMgAl_{11}O_{19}:Tb^{3+}$
$GdMgB_5O_{10}:Ce^{3+}, Tb^{3+}, Mn^{2+}$
$(Ba,Sr,Ca)MgAl_{10}O_{17}:Eu^{2+}, Mn^{2+}$
$Zn_2(Si,Ge)O_4:Mn^{2+}$
$SrAl_xO_{(1+3/2x)}:Eu^{2+}$ (x=2–2.4)
$(Ba,Sr,Ca)_2SiO_4:Eu^{2+}$
$GdB_3O_6:Ce^{3+}, Mn^{2+}$

ORANGE:
$(Y,In,Gd,La,Lu,Sc)BO_3:Eu^{3+}$
$YVO_4:Dy^{3+}$
$GdMgB_5O_{10}:Ce^{3+}, Dy^{3+}$
$(Tb,Y,Lu,La,Gd)_3(Al,Ga)_5O_{12}:Ce^{3+}$
$(Ba,Sr,Ca)_5(PO_4)_3(Cl,F,OH):Eu^{2+}, Mn^{2+}, Sb^{3+}$
$(Sr,Ba)GdB_8O_{16}:Eu^{3+}$

RED:
$(Y,Gd,La,Lu,Sc)_2O_3:Eu^{3+}$
$(Y,Gd,La,In,Lu,Sc)BO_3:Eu^{3+}$
$(Y,Gd,La)(Al,Ga)O_3:Eu^{3+}$
$(Ba,Sr,Ca)(Y,Gd,La,Lu)_2O_4:Eu^{3+}$
$(Y,Gd)Al_3B_4O_{12}:Eu^{3+}$
monoclinic $Gd_2O_3:Eu^{3+}$
$(Gd,Y)_4(Al,Ga)_2O_9:Eu^{3+}$
$(Ca,Sr)(Gd,Y)_3(Ge,Si)Al_3O_9:Eu^{3+}$
$YVO_4:Eu^{3+}$
$(Y,Gd,La,Lu)_3GaO_6:Eu^{3+}$
$(Sr,Mg)_3(PO_4)_2:Sn^{2+}$
$3.5MgO-0.5MgF_2—GeO_2:Mn^{4+}$
$GdMgB_5O_{10}:Ce^{3+}, Mn^{2+}$ DEEP RED:
$(Sr,Mg)_3(PO_4)_2:Sn^{2+}$
$3.5MgO-0.5MgF_2—GeO_2:Mn^{4+}$
$GdMgB_5O_{10}:Ce^{3+}, Mn^{2+}$

EXAMPLES

Fluorescent lamps were produced utilizing different phosphor blends including $SrY_2O_4:Eu^{3+}$, $(Y_{0.55}Gd_{0.35}Eu_{0.10})BO_3$, $(Gd,Y)Al_3B_4O_{12}:Eu^{3+}$ by preparing aqueous suspensions of the phosphor blends and applying the suspensions to the inside surfaces of fluorescent glass envelopes. The CRI of the resulting lamps (1–5) were compared to a lamp prepared with known tri-phosphor blends (6) with the same color correlated temperature. The results are set forth in Table 1. All of the examples were prepared to provide a lamp having a CCT of 4000 K for ease of comparison.

TABLE 1

CRI of Lamps Containing Various Phosphor Blends at 4000 K

|  | 1 | 2 | 3 | 4 | 5 |
| --- | --- | --- | --- | --- | --- |
| $SrY_2O_4:Eu^{3+}$ | — | — | — | 0.419 | 0.461 |
| $(Gd,Y)Al_3B_4O_{12}:Eu^{3+}$ | — | — | 0.442 | — | — |
| $(Y_{0.55}Gd_{0.35}Eu_{0.10})BO_3$ | 0.438 | 0.487 | — | — | — |
| $LaPO_4:Ce,Tb$ | 0.299 | 0.292 | 0.312 | 0.313 | 0.312 |
| $BaMgAl_{10}O_{17}:Eu^{2+},Mn^{2+}$ | — | 0.109 | — | — | 0.098 |
| $Sr_4Al_{14}O_{25}:Eu^{2+}$ | 0.189 | — | 0.195 | 0.178 | — |
| $BaMgAl_{10}O_{17}:Eu^{2+}$ | 0.074 | 0.112 | 0.05 | 0.09 | 0.128 |
| CRI | 93 | 90.5 | 91 | 93 | 92 |
| Luminosity (Lm/W) | 315 | 317.5 | 298 | 313 | 315 |

Light output plots as a function of wavelength for each of examples 1–5 above are shown in FIGS. 2–6, respectively. A lamp was also prepared using a conventional tri-phosphor blend comprising $LaPO_4:Ce,Tb;Sr_5(PO_4)_3(Cl,F,OH):Eu^{2+}$; and $Y_2O_3:Eu^{3+}$. The conventional lamp exhibited a CRI of 83.5 with a luminosity of 345 at 4000 K. Thus, lamps made with the phosphor blends comprising the above described red phosphors exhibit improved CRI with comparable luminosity as present lamps.

The relative proportions of the individual phosphors in the various embodiment phosphor blends may be adjusted such that when their emissions are blended and employed in a fluorescent lamp, there is produced visible light of predetermined x and y values of CIE coordinates wherein the x value is in the range of about 0.30 to about 0.40, and said y value is in the range of about 0.30 to about 0.40.

Additionally, the relative proportions of the components are such that the resulting light exhibits an increased CRI as compared to a tri-component blend formed from conventional tri-phosphor component blends for a lamp having a given CCT. The relative amounts of each phosphor can be described in terms of spectral weight. The spectral weight is the relative amount that each phosphor contributes to the overall emission spectra of the phosphor blend when excited by UV light. The spectral weights of all the individual phosphors should add up to 1. Although not intended to be limiting, the phosphor blend of the present invention may generally contain about 0.05–0.3 of a blue phosphor, about 0.05–0.3 of a blue-green phosphor, about 0.05–0.6 of a green phosphor, about 0.05–0.55 of one of the present red phosphors, about 0.0–0.6 of an orange phosphor and about 0.0–0.2 of a deep red phosphor.

The phosphor blend described above may be used in many different applications. For example, the material may be used as a phosphor in lamp, in a cathode ray tube, in a plasma display device or in a liquid crystal display. The material may also be used as a scintillator in an electromagnetic calorimeter, in a gamma ray camera, in a computed tomography scanner or in a laser. These uses are meant to be merely exemplary and not exhaustive. In a preferred embodiment, the phosphor is used in a fluorescent light, as described above.

Preferably the CRI is greater than about 90. The proportions of the phosphor components are adjusted to obtain the high brightness and CRI throughout the desirable color point range so that so that lamps have uniformly high brightness and color point. In addition, the resulting fluorescent lamps will have a correlated color temperature (CCT) of 2500–10000, more preferably 3000–1000 K, depending on the relative amounts of the various phosphors used.

Additional additives may be included in the phosphor blend and can include a dispersion vehicle, binder and one or more of various known non-luminescent additives, including, e.g., alumina, calcium phosphate, thickeners, dispersing agents, and certain borate compounds as are known in the art.

In the coating procedure typically the various phosphor powders are blended by weight. The resulting powder is then dispersed in a water based system (which may contain other additives as are known in the art, including adherence promoters such as hydroxyethylcellulose or fine non-luminescent particles of alumina or calcium pyrophosphate) optionally with a dispersing agent as is known in the art. A thickener may be added, typically polyethylene oxide. The suspension is then typically diluted with deionized water until it is suitable for producing a coating of the desired thickness or coating weight. The phosphor blend suspension is then applied as a coating to the inside of the glass tube (preferably by pouring the suspension down the inside of a vertically-held tube or pumping the suspension up into same) and heated by forced air until dry, as is known in the art. After the first thin coat or layer is applied, additionally desired thin coats or layers may be applied in the same manner, carefully drying each coat before the next coat is applied. In the present invention the thin layers are built up until the total or cumulative coating thickness is sufficient to absorb substantially all of the UV light produced by the arc. This will typically be a phosphor layer of from about 4–6 particles thick. Although not intended to be limiting, this typically corresponds to a thickness of between about 1 and about 25 microns, preferably between 1 and 10 microns, depending on the exact composition of the phosphor blend and the particle size of the phosphors.

Figure 6:
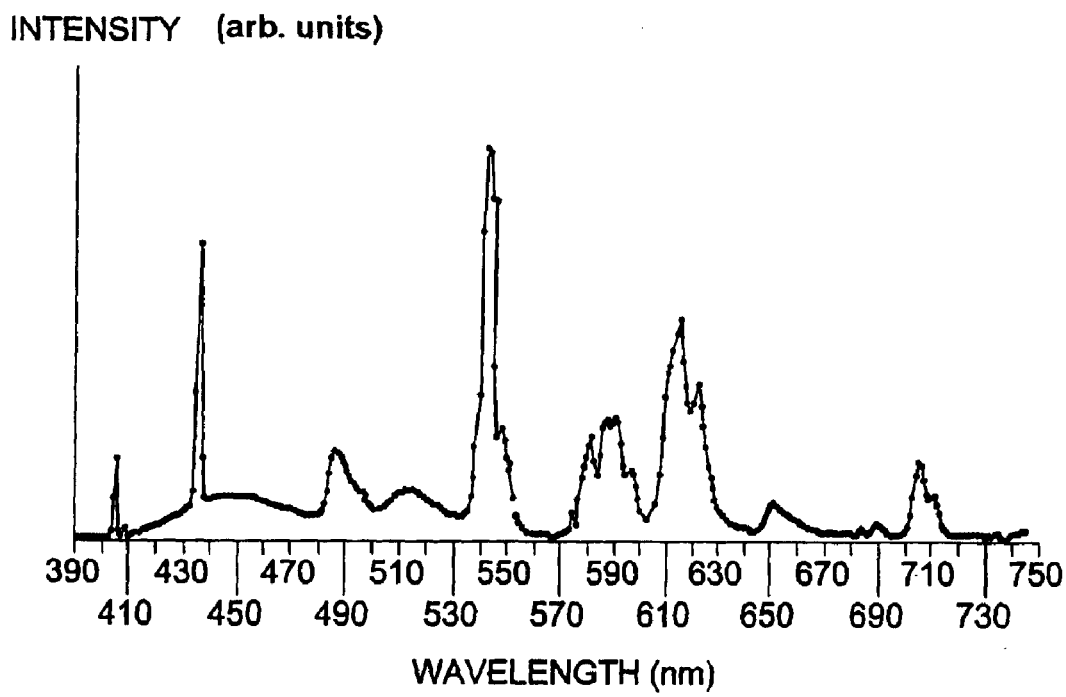
FIG. 6 is a plot of light output versus wavelength for a lamp having a phosphor layer according to the invention.
Figure 8:
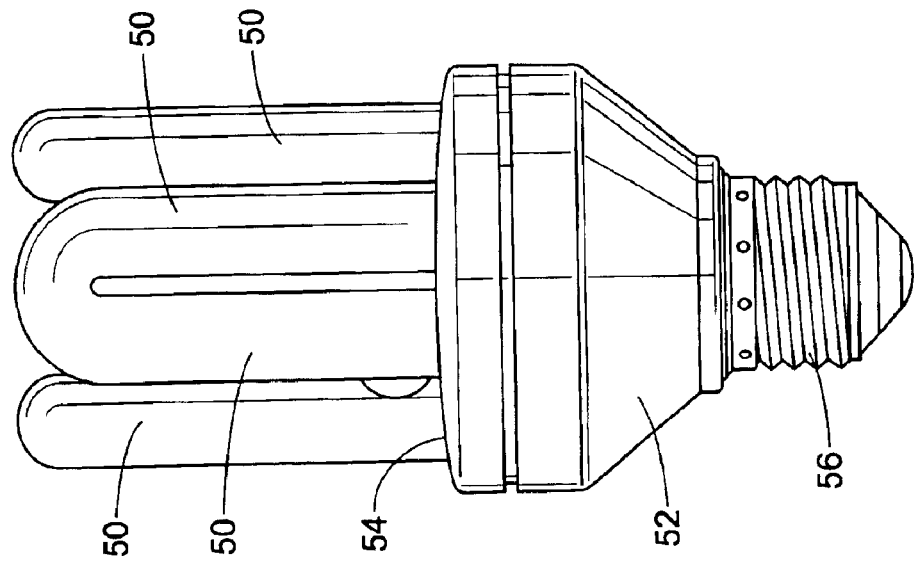
FIG. 8 is a cross-section of an alternate compact fluorescent lamp according to another embodiment of the present invention.
Figure 7:
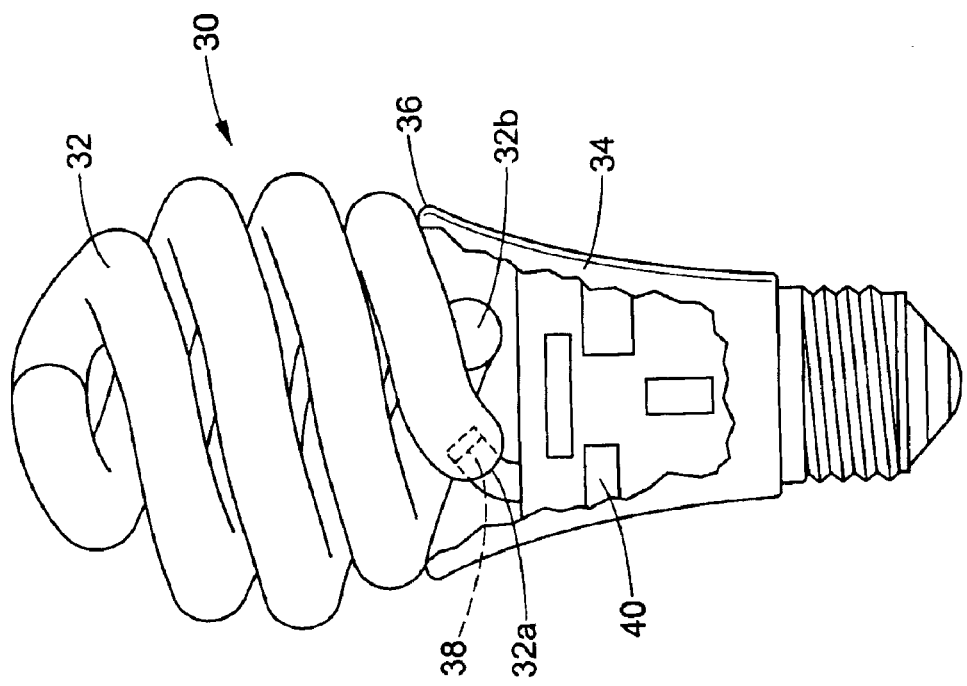
FIG. 7 is a cross-section of a compact fluorescent lamp according to an embodiment of the present invention.

While the invention has been described in detail and with reference to specific embodiments thereof, it will be apparent to one skilled in the art that various changes and modifications can be made therein without departing from the spirit and scope of the invention. For example, as can be seen in FIGS. 6 and 7, the phosphor blend of the present invention can be used in a compact fluorescent lamp arrangement. With reference to FIG. 6, a helical compact fluorescent lamp 30 is shown, having a lamp envelope or tube 32 in a coiled double helix configuration. End portions 32a, 32b enter the top portion 36 of the housing member 34; disposed within the end portions 32a, 32b are electrodes 38 which are electrically coupled to a ballast circuit arrangement 40 mounted within housing member 34. With respect to FIG. 7, a compact fluorescent lamp having a fluorescent tube 50, a housing 52 closed by a cap 54 and, according to the example, a screw base 56 is seen in side view. The compact fluorescent lamp is connected electrically to the mains through the base known in the art, and wires coming from the connection portions of the base are connected to a ballast circuit arranged inside the housing 52 and/or to electrodes of the fluorescent tube 50.

What is claimed is:

1. An arc discharge lamp having an improved color rendering index for a given color coordinated temperature, the lamp comprising
    a lamp envelope enclosing a discharge space and having an inner surface;
    an ionizable medium within said lamp envelope comprising mercury and an inert gas;
    first and second electrodes; and
    a phosphor layer comprising a phosphor blend on said inner surface, said blend including: a green phosphor having a peak emission at about 525 to about 570 nm, a blue-green phosphor having a peak emission from about 475–525 nm, a blue phosphor having a peak emission from 430 to 460 nm and a red phosphor selected from the group consisting of $SrY_2O_4:Eu^{3+}$, $(Y,Gd)Al_3B_4O_{12}:Eu^{3+}$, and $[(Y_{1-x-y-m}La_y)Gd_x]BO_3:Eu_m$ wherein y<0.50 and m=0.001–0.3.

2. A lamp according to claim 1, wherein said lamp exhibits a correlated color temperature of between about 2500 to about 10000 Kelvin and a color rendering index of about 90 or above.

3. A lamp according to claim 1, further comprising a second phosphor layer comprising a halophosphor.

4. A lamp according to claim 3, wherein said second phosphor layer comprises a calcium halophosphate.

5. A lamp according to claim 1, further comprising at least one of a deep red phosphor having a peak emission at about 615 to 665 nm and an orange phosphor having a peak emission from about 550 to 600 nm.

6. A lamp according to claim 1, wherein said red phosphor comprises $SrY_2O_4:Eu^{3+}$.

7. A lamp according to claim 1, wherein said red phosphor comprises $(Y,Gd)Al_3B_4O_{12}:Eu^{3+}$.

8. A lamp according to claim 1, wherein said phosphor layer comprises $LaPO_4:Ce,Tb$; $Sr_4Al_{14}O_{25}:Eu^{2+}$; and $BaMgAl_{10}O_{17}:Eu^{2+}$.

9. A lamp according to claim 1, wherein said phosphor layer comprises $LaPO_4:Ce,Tb$; $BaMgAl_{10}O_{17}:Eu^{2+}$; and $BaMgAl_{10}O_{17}:Eu^{2+}, Mn^{2+}$.

10. A lamp according to claim 1, wherein said red phosphor is $(Y_{0.55}Gd_{0.35}Eu_{0.10})BO_3$.

11. A lamp according to claim 1, further comprising a UV reflecting barrier layer comprising at least one of alpha- and gamma-aluminum particles.

12. A lamp according to claim 1, wherein said lamp emits visible light having predetermined color coordinates on the CIE scale wherein the x value is in the range of 0.3 to 0.4 and y is in the range of 0.3 to 0.4.

13. A lamp according to claim 1, wherein said phosphor layer has a median particle size of 1 to 10 microns.

14. A lamp according to claim 1 wherein said thickness of said phosphor layer is 4–6 particles thick.

15. A lamp according to claim 1, wherein said phosphor blend comprises, by spectral weight, about 0.05–0.3 of a blue phosphor, 0.05–0.3 of a blue-green phosphor, 0.05–0.6 of a green phosphor, 0.05–0.55 of said red phosphor, 0.0–0.6 of an orange phosphor and 0.0–0.2 of a deep red phosphor, based on a total spectral weight of 1.

16. A fluorescent lamp according to claim 1, wherein said lamp is a compact fluorescent lamp.

17. A phosphor blend capable of absorbing UV radiation and emitting visible light, said blend comprising a green emitting phosphor, a blue-green emitting phosphor, a blue emitting phosphor, and red phosphor selected from the group consisting of $SrY_2O_4:Eu^{3+}$, $(Y,Gd)Al_3B_4O_{12}:Eu^{3+}$, and $[(Y_{1-x-y-m}La_y)Gd_x]BO_3:Eu_m$ wherein y<0.50 and m=0.001–0.3; wherein said green phosphor has a peak emission at about 525 to about 570 nm, said blue-green phosphor has a peak emission from about 475–525 nm, and said blue phosphor has a peak emission from 430 to 460 nm.

18. A phosphor blend according to claim 17, further comprising at least one of a deep red phosphor having a peak emission at about 615 to 665 nm and an orange phosphor having a peak emission from about 550 to 600 nm.

19. A phosphor blend according to claim 17, wherein said red phosphor comprises $SrY_2O_4:Eu^{3+}$.

20. A phosphor blend according to claim 18, wherein said red phosphor comprises $(Y,Gd)Al_3B_4O_{12}:Eu^{3+}$.

21. A phosphor blend according to claim 17, wherein said phosphor layer comprises $LaPO_4:Ce,Tb$; $Sr_4Al_{14}O_{25}:Eu^{2+}$; and $BaMgAl_{10}O_{17}:Eu^{2+}$.

22. A phosphor blend according to claim 17, wherein said phosphor layer comprises $LaPO_4:Ce,Tb$; $BaMgAl_{10}O_{17}:Eu^{2+}$; and $BaMgAl_{10}O_{17}:Eu^{2+}, Mn^{2+}$.

23. A phosphor blend according to claim 17, wherein said red phosphor is $(Y_{0.55}Gd_{0.35}Eu_{0.10})BO_3$.

24. A phosphor blend according to claim 17, wherein said blend has a median particle size of 1 to 10 microns.

25. A phosphor blend according to claim 12, wherein said phosphor blend comprises, by spectral weight, about 0.05–0.3 of a blue phosphor, 0.05–0.3 of a blue-green phosphor, 0.05–0.6 of a green phosphor, 0.05–0.55 of said red phosphor, ≦0.6 of an orange phosphor and ≦0.2 of a deep red phosphor, based on a total spectral weight of 1.

26. A lamp according to claim 1, wherein said phosphor blend comprises $LaPO_4:Ce_3+,Tb^{3+}$; $(Ba,Sr,Ca)_5(PO_4)_3(Cl,F,OH):Eu^{2+}, Mn^{2+}Sb^{3+}$; and $BaMgAl_{10}O_{17}:Eu^{2+}, Mn^{2+}$.

27. A lamp according to claim 1, wherein said phosphor blend comprises $LaPO_4:Ce^3+,Tb^{3+}$; $(Ba,Sr,Ca)_5(PO_4)_3(Cl,F,OH):Eu^{2+}, Mn^{2+}Sb^{3+}$; and $Sr_4Al_{14}O_{25}:Eu^{2+}$.

28. A phosphor blend according to claim 17, wherein said phosphor blend comprises $LaPO_4:Ce^3+,Tb^{3+}$; $(Ba,Sr,Ca)_5(PO_4)_3(Cl,F,OH):Eu^{2+}, Mn^{2+}, Sb^{3+}$; and $BaMgAl_{10}O_{17}:Eu^{2+}, Mn^{2+}$.

29. A phosphor blend according to claim 17, wherein said phosphor blend comprises $LaPO_4:Ce^3+,Tb^{3+}$; $(Ba,Sr,Ca)_5(PO_4)_3(Cl,F,OH):Eu^{2+}, Mn^{2+}, Sb^{3+}$; and $Sr_4Al_{14}O_{25}:Eu^{2+}$.

* * * * *

UNITED STATES PATENT AND TRADEMARK OFFICE
CERTIFICATE OF CORRECTION

PATENT NO. : 6,965,193 B2
APPLICATION NO. : 10/317423
DATED : November 15, 2005
INVENTOR(S) : Alok Srivastava et al.

It is certified that error appears in the above-identified patent and that said Letters Patent is hereby corrected as shown below:

On the title page: Item [75] Inventors:

Correct spelling of the third inventors name is: Venkatesan Manivannan

Signed and Sealed this

Twenty-fourth Day of April, 2007

JON W. DUDAS
*Director of the United States Patent and Trademark Office*